United States Patent Office 2,863,173
Patented Dec. 9, 1958

2,863,173

PROCESS FOR CLARIFYING ORIENTED VINYLIDENE CHLORIDE POLYMER FILMS

Carl P. Zupic, Midland, Mich., assignor to The Dow Chemical Company, Midland, Mich., a corporation of Delaware No Drawing. Application March 26, 1956
Serial No. 573,590

3 Claims. (Cl. 18—48)

This invention relates to a novel process for clarifying thermoplastic films. More particularly it relates to a process for clarifying oriented plastic films having incompatible agents incorporated therein.

Plastic films, such as those produced from normally crystalline vinylidene chloride polymers have found wide acceptance as packaging materials. Many of such films and particularly those in which the polymeric substance is composed predominantly of vinylidene chloride have a tendency to stick to one another due to electrostatic charges, on other cohesive forces resulting from their physical and chemical makeup, which has made the handling of such films extremely difficult. Because of such tendencies, the full sales potential of those films could not be realized. To overcome the difficulties due to cohesion, two methods have been attempted. The first of such methods involved dusting the surfaces of the film during production with solid materials. It was found to be very difficult to apply the solid materials uniformly by mechanical means. The second method for reducing the cohesive tendency of the film was to blend into the polymer, prior to fabrication, a small amount of an incompatible, inert, inorganic salt, such as tetrasodium pyrophosphate, and to produce the film by the usual procedure, as by extrusion. The incompatible salt, although in extremely finely divided condition, was still capable of producing a roughened surface on the film which resulted in greatly reduced cohesive tendency. The incompatible salt could be blended into the formulation simultaneously with the other common additives, such as stabilizers and plasticizers, and no added cost due to extra procedural steps was involved. However, the addition of incompatible salts even in finely divided condition and in amounts as small as 0.2 percent caused a haziness in the film when the film was oriented, reducing its clarity and transparency appreciably. It would be desirable to have a process for clarifying oriented thermoplastic films having an opacity due to the presence therein of incompatible agents, and the provision of such a process is the principal object of this invention.

It is a further object to provide such a process whereby the anti-cohesive properties imparted to the film by the incompatible agent will not be reduced.

The above and related objects are accomplished by means of a process whereby an oriented thermoplastic film, having incorporated therein an incompatible, inert, inorganic compound to reduce the cohesive tendency thereof is subjected to a pressure capable of squeezing the polymer into intimate continuous surface contact with the cohesive compound. When films having a haziness due to the presence of such incompatible compounds are processed in this manner, the resulting film is relatively clear and more transparent than before treatment and its non-cohesive quality is retained.

The polymers and copolymers capable of forming oriented, thin, transparent films are well known. Among such polymers may be mentioned those composed predominantly of vinylidene chloride with small but significant amounts of a copolymerizable monoethylenically unsaturated monomer such as vinyl chloride, vinyl acetate, or acrylonitrile. Such polymers represent a preferred class because of their inherently strong cohesive tendencies in unmodified condition, because of the unusually desirable properties of films prepared from them, and because of the ease of orientation of those films.

Among the incompatible, inert, inorganic compounds that impart anti-cohesive characteristics to oriented films may be mentioned the inorganic phosphates. A preferred class of compounds for use with the normally crystalline vinylidene chloride polymers is exemplified by tetrasodium pyrophosphate, sodium tripolyphosphate, trisodium phosphate, and sodium tetraphosphate. In any case, the compound must be inert to the polymer so that it will not dissolve the polymer or be dissolved in the polymer, degrade, or in any other manner adversely affect the properties of the film dependent upon the chemical nature of the polymer. The salts, such as copper and iron salts, which may degrade certain polymers, such as normally crystalline vinylidene chloride polymers, are well known in the art and should be avoided.

It should be apparent that the anti-cohesive agent must be in finely divided condition for use in film production. When the particulate size is greater than a few microns the particles cause loci of poor tear strength in the films. The agents must be solid to impart the roughness necessary to confer anti-cohesive qualities to the films. Additionally, the agent must be capable of withstanding the normal temperatures encountered in the thermal fabrication of polymers without melting or decomposition.

The amounts of such agents that have been found useful in conferring anti-cohesive qualities to plastic films ranges from 0.01 to 1 percent by weight based on the weight of the polymer. When smaller amounts are employed, the cohesive tendencies of the film are not reduced and when larger amounts are used therein is no beneficial result and the physical properties of the film suffer.

Plastic films are commonly prepared by extruding the polymer formulation in molten condition through a suitable die. To achieve films of normally crystalline polymers in a supercooled condition from which they are orientable it is the usual practice to chill the freshly extruded film by passage under low tension through a bath of non-solvent at a relatively low temperature. Other methods for preparing films include the casting, doctoring, and curing of solutions and latexes of the polymer. To achieve the supercooled condition necessary to the orientation of cast films of crystalline polymers, it is then necessary to warm the film to a temperature capable of melting or dissolving the individual crystallites and then to chill the amorphous film to a relatively low temperature.

When extrusion methods are to be used, the agents may be incorporated by the usual blending procedures used for incorporating plasticizers and stabilizers into a polymer formulation. Those methods commonly consist of milling or mixing the ingredients for rather prolonged periods of time. When casting operations are to be employed in preparing the films, the anti-cohesive ingredients, if insoluble in the dispersion medium, may be stirred into the solution or latex prior to casting.

Following preparation and supercooling, the films are oriented by stretching them beyond the point of elastic recovery. In so doing, the crystallites that are formed have their major axes aligned principally in the direction of the applied stress which will be parallel to a major surface. During the stretching it has now been found that the polymer, being deformable under the stress, pulls away from the non-deformable particles of the incompatible anti-blocking agent, leaving voids of various sizes and shapes surrounding the particles. The haziness that is apparent from such oriented films is believed to be due to the light scattering caused by these polymer-void interfaces.

After orientation, the films are subjected to pressure and thermal conditions capable of filling those voids with polymer to thereby destroy the polymer-void interface. Although pressure may be employed alone at ordinary temperatures it has been found in such cases that the required pressures are very high being of the order of 1000 pounds per square inch or higher. Accordingly, it is preferred to combine the pressure treatment with an elevated temperature to reduce the resistance to flow of the polymer. In addition, since the polymer is more plastic at the slightly elevated temperatures, the polymer will more readily and thoroughly conform to the rough surface of the particles of anti-cohesive agent. It should be apparent that the maximum temperature employed must be well below the softening temperature of the crystallites in the polymer so that the orientation is not substantially destroyed. For similar reasons it is desirable that the pressurizing be conducted with the film under enough tension to prevent destruction or alteration of the orientation due to film relaxation. This may be done by applying the pressure simultaneously over a relatively large area, as is possible with those reciprocal presses having large platens. If it is desired to employ thermal means in conjunction with the pressure, the platens may be heated by means of heat transfer fluids. Similarly, pressure rolls may be used on continuous films maintained under tension.

The temperatures which have been found to be especially convenient when normally crystalline vinylidene chloride polymers are used are from about 50° C. to 100° C., although higher or lower temperatures may be used. When using those temperatures the pressures that have been found to be operable are from about 300 p. s. i. to 800 p. s. i. The pressures and temperatures employed will vary to some extent depending upon the polymer employed, the thickness of the film, the amount and nature of anti-cohesive agent used, and the amount of orientation in the film.

The time required to clarify the films will vary with the pressures and temperatures employed, the nature of the polymer and the thickness of the film. Within the ranges of temperatures and pressures given above it has been found that when the films are of a thickness of 0.01 inch or less they should be pressurized for at least 30 minutes.

The operation and advantages of the process will be more apparent from the following illustrative examples wherein all parts are by weight.

Example 1

A film of a copolymer prepared from 85 percent by weight of vinylidene chloride and 15 percent by weight of vinyl chloride and in which was blended 0.2 percent by weight of tetrasodium pyrophosphate, was prepared by extruding the molten polymer formulation as a thin tube into a water bath at 10° C. to supercool it. The tubular film was then oriented radially and longitudinally, in conventional manner, and a single thickness was found to have 9.9 percent haze as measured by the transmission of the visible spectrum through the film using a spectrophotometer. The oriented film was placed in a press having heated platens and subjected to a pressure of 600 p. s. i. at 80° C. for 2 hours. The resulting film was clear and was found to have 5.8 percent haze.

For purpose of comparison a similar film was prepared but using no tetrasodium pyrophosphate and was found to have a haze of 0.6%.

The cohesive tendencies of the films were checked using the following procedure. One layer of the film is attached to a variable angle inclined plane. A second sheet of the film is attached to a small flat weight of 0.07 pound with a contact area of 1 square inch. With the films in contact, the angle of the plane is increased until sliding occurs. The larger the angle prior to sliding the greater is the cohesive tendency. With the oriented but unpressurized film containing anti-cohesive agent the maximum angle of repose was found to be 35°. With the oriented and pressurized film of this invention containing anti-cohesive agent the maximum angle was still 35°. With the oriented film containing no anti-cohesive agent, the plane could be raised almost to 90° without slippage.

Example 2

Extruded films prepared from 73 percent by weight of vinylidene chloride and 27 percent by weight of vinyl chloride and containing 1 percent tetrasodium pyrophosphate were supercooled and oriented. The films had 33.5 percent haze and a maximum angle of repose of 42°. After the films were subjected to a pressure of 600 p. s. i. at 90° C. for 4 hours, they had 19.4 percent haze and still had a maximum angle of repose of 42°.

A similar film was prepared and oriented except that the tetrasodium pyrophosphate was omitted. The film had 1.8 percent haze but the plane could be inclined to about 90° without slippage.

A secondary application of the process is to produce films of a given degree of haziness for special effects in packaging. Thus, if it is desired to prepare films having 25 percent haze, a film may first be prepared having a haze greater than 25 percent and the haze adjusted to 25 percent using this process.

I claim:

1. A process for clarifying oriented thermoplastic polymer films of a normally crystalline vinylidene chloride polymer having an inherent haze due to the presence in said film of voids surrounding discrete particles of an incompatible, inert, inorganic compound comprising subjecting said film while under tension sufficient to maintain said orientation to an applied pressure of from 300 to 800 pounds per square inch at a temperature of from 30° to 100° C., thereby to force said polymer into intimate engagement with said particles of said incompatible compound.

2. The process claimed in claim 1 wherein said incompatible compound is tetrasodium pyrophosphate.

3. The process claimed in claim 1, wherein normally crystalline vinylidene chloride polymer is a copolymer of vinylidene chloride and vinyl chloride containing at least about 70 percent by weight vinylidene chloride.

References Cited in the file of this patent

UNITED STATES PATENTS

| | | |
|---|---|---|
| 2,352,725 | Markwood | July 4, 1944 |
| 2,462,149 | Webb | Feb. 22, 1949 |
| 2,512,463 | Maier | June 20, 1950 |
| 2,517,570 | Irons | Aug. 8, 1950 |
| 2,706,310 | Eckler et al. | Apr. 19, 1955 |